Figure 1:
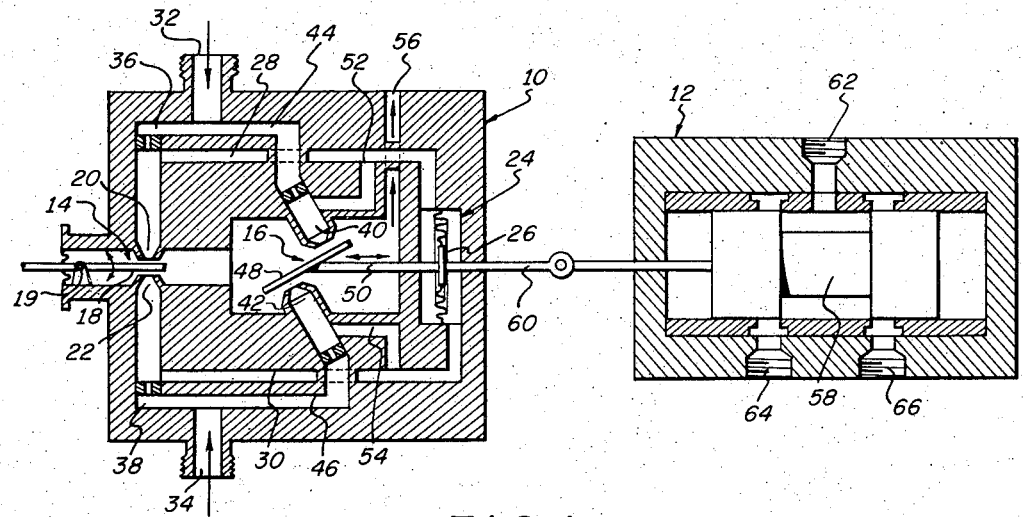

Sept. 5, 1961  W. F. CLEMENT  2,998,804
TWO STAGE VALVE
Filed July 1, 1960

INVENTOR
WARREN F. CLEMENT
BY
ATTORNEY

United States Patent Office 2,998,804
Patented Sept. 5, 1961

2,998,804
TWO STAGE VALVE
Warren F. Clement, Glen Head, N.Y., assignor to Sperry Rand Corporation, Great Neck, N.Y., a corporation of Delaware
Filed July 1, 1960, Ser. No. 40,420
9 Claims. (Cl. 121—41)

This invention relates generally to valves and more particularly to the first stage of two stage valves that are operated by compressible fluids and are utilized in servomechanisms.

A two stage valve is usually employed in a servo when increased sensitivity to small input signals is required. Such increased sensitivity is usually necessary because the static friction of movable elements within the servo causes the servo to respond erratically to small input signals. As is known, two stage valves usually comprise a highly responsive first stage and a main control second stage. The first stage is activated by an input command signal and operates to activate the main control second stage. As the second stage is activated, a signal is fed back from the output of the first stage to the input of the first stage which tends to cancel the signal activating the first stage. The process of feeding back a signal from the first stage output to the first stage input itself has a detrimental effect on the operation of the servo. At the instant the movable elements within the servo start to move, maximum signal should be present at the input to the first stage to overcome the static friction of the movable servo elements. However, with the feed-back arrangements presently utilized in the art, cancellation of the input signal occurs at the very time maximum input signal is necessary.

The present invention provides a novel feed-back arrangement between the output and input of the first stage of a two stage valve. The feed-back arrangement is such that the fed-back signal is delayed in time just long enough for the movable servo elements to overcome their static friction. Generally, the first stage of a two stage valve embodying the invention is provided with an input valve and a feed-back valve. The input valve, upon receiving a command signal, applies the pressure of a compressible fluid to a diaphragm actuator having a very flexible diaphragm. The actuator in turn operates the main control second stage. In addition to operating the main control second stage, the diaphragm actuator operates the feed-back valve of the first stage. When operated, the feed-back valve also applies the presssure of a compressible fluid to the diaphragm actuator, but in such a way as to abate the effect of the compressible fluid pressure from the input valve. Since a period of time is necessary for the diaphragm actuator to feel the effect of the compressible fluid pressure from the feed-back valve, the aforementioned abatement, i.e., feed-back does not occur immediately. Hence, time delayed feed-back to the input valve is effected.

Accordingly, it is a prime object of the invention to provide, in a two stage valve, an improved first stage which has delayed feed-back from the output of the first stage to the input of that stage, thereby providing increased sensitivity of the two stage valve to small input signals.

Another object of the invention is to provide a two stage valve wherein the output of the first stage drives the second stage and wherein a signal representing the first stage output is fed back, delayed in time, to the input of that stage.

Figure 2:
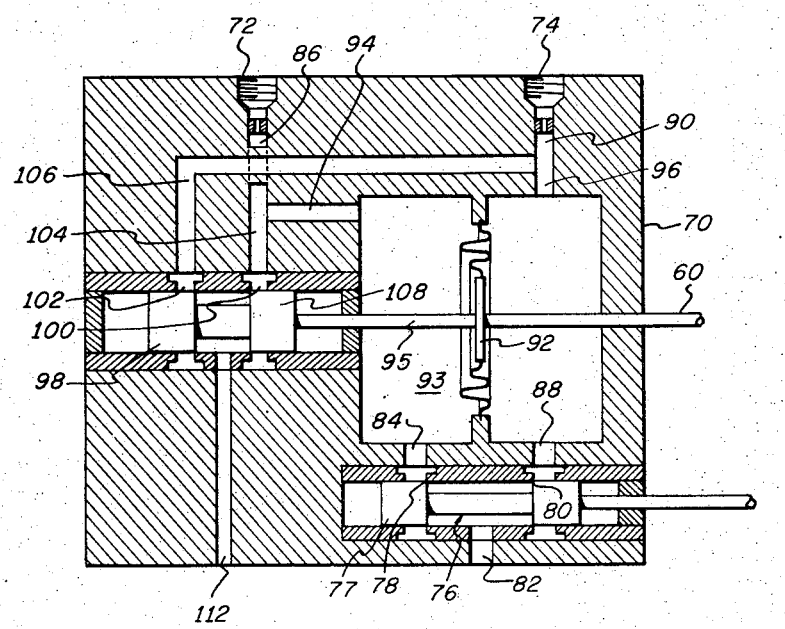

The invention will be described with reference to the drawings, wherein:

FIG. 1 is a cross-sectional view of a two stage valve embodying the invention and employing in its first stage a pair of double-nozzle flapper valves; and FIG. 2 is a cross-sectional view of a first stage of a two stage valve embodying the invention, said first stage employing a pair of spool-type valves and being adapted to have connected to its output shaft a second stage of the type shown in FIG. 1.

Referring to FIG. 1, the first stage 10 of a gas operated two stage valve is mechanically connected to and operates a second stage 12. The first stage 10 is provided with a pair of double-nozzle flapper valves 14 and 16 which are respectively an input flapper valve and a feed-back flapper valve. The input flapper valve 14 has its flapper 18 spacially aligned with its nozzles 20 and 22. The flapper 18 is pivotally mounted at 19 and may be positioned relative to the nozzles 20 and 22, but always in spacial alignment with those nozzles. The nozzles 20 and 22 are connected to a diaphragm actuator 24 by conduits 28 and 30. The connection of the conduits to the actuator is such that opposite faces of the diaphragm 26 are exposed respectively to the pressures within the conduits 28 and 30. High pressure gas is admitted to the first stage 10 via connections 32 and 34 and applied to the input flapper valve 14 respectively via conduits 36 and 38. The feed-back flapper valve 16 is provided with skewed nozzles 40 and 42. The nozzle 40 receives high pressure gas via the connection 32 and a conduit 44 and the nozzle 42 receives high pressure gas via connection 34 and a conduit 46. The flapper 48 of feedback flapper valve 16 is mechanically linked to the diaphragm 26 by a rod 50. It is essential that the diaphragm 26 be very flexible and offer no restorative force when it is flexed. This is because restorative force appears to the input flapper valve as a fed-back signal without delay. Flexing of the diaphragm 26 to the right causes the rod 50 to position the flapper 48 close to the nozzle 42. Flexing of the diaphragm to the left causes the rod 50 to position the flapper 48 close to the nozzle 40. The nozzles 40 and 42 are connected respectively to the conduits 28 and 30 by conduits 52 and 54. Exhaust gas is removed from the first stage 10 via an orifice 56.

The second stage 12, in this form of the invention, is a spool-type valve. The spool 58 of the second stage 12 is connected to and positioned by the diaphragm actuator 24 by means of a rod 60. High pressure gas is admitted into the second stage 12 via a connection 62. The gas is then connected to either side of a gas driven motor, or the like, via orifice 64 or 66. Movement of the spool 58 to the left allows gas to flow through the orifice 64 and none through the orifice 66. With movement of the spool to the right, the opposite occurs.

In operation, with a command signal applied to the first stage 10, the flapper 18 of the input flapper valve 14 is positioned closer to either nozzle 20 or nozzle 22. With the flapper 18 positioned closer to the nozzle 20 than to the nozzle 22, the gas pressure within the conduit 28 rises and the gas pressure within the conduit 30 falls. These pressures are applied respectively to opposite faces of the diaphragm 26 and cause the diaphragm to flex, thereby moving the rods 50 and 60 to the right. As the rods are moved to the right, the spool 58 of the second stage closes off the orifice 64 and permits the high pressure gas entering the connection 62 to pass through the orifice 66. Also, as the rods 50 and 60 are moved to the right, the flapper of the valve 16 is positioned closer to the nozzle 42 than to the nozzle 40. This causes the pressure in the conduit 54 to rise and the pressure in the conduit 52 to fall. Because of the finite length of the conduit between the nozzle and one face of the diaphragm 26 and the finite length of the conduit between the nozzle 30 and the other face of the diaphragm 26, and also because of the finite volumes of those conduits and the diaphragm actuator 24, the gas pressures in the conduits 52 and 54 are not applied to respective faces of the diaphragm 26 until a time after the flapper 48 is positioned close to nozzle 30. Eventually, however, a high pressure is applied to the right of the diaphragm 26 via the conduits 54 and 30 and a low pressure is applied to the left of the diaphragm 26 via the conduits 52 and 28. These pressures then operate to oppose the force flexing the diaphragm to the right. Since the opposition to the forces on the diaphragm which result from the input command signal is not applied until a time after the input command signal is applied, feed-back which is delayed in time is effected.

When a command input signal to the input flapper valve 14 causes the flapper 18 to be positioned closer to the nozzle 22 than to the nozzle 20, the opposite of the above-described action occurs.

Referring to FIG. 2, the cross-section of the first stage 70 of another two stage valve embodying the invention is shown. High pressure gas is admitted into the first stage 70 via connections 72 and 74. An input spool-type valve 76 is provided with input orifices 78 and 80 and an exhaust outlet 82. The orifice 78 is connected to receive high pressure gas via conduits 84, 94 and 86 and the orifice 80 is connected to receive high pressure gas via conduits 88, 96 and 90. Contained within the valve 76 is a spool 77 which is positioned to the left and right in accordance with input command signal. The conduits 86 and 90 are coupled respectively to the diaphragm actuator 93 by conduits 94 and 96. The diaphragm 92 contained within the actuator 93 has each of its faces respectively exposed to the pressure within the conduit 94 and the pressure within the conduit 96. The diaphragm 92 has connected to it the rod 95 and the rod 60 which is also connected to the second stage 12. Both rods 60 and 95 move to the left and right as the diaphragm is flexed respectively to the left and right. It is essential that the diaphragm 92, like the diaphragm 26 of FIG. 1, be highly flexible and offer no restorative force when it is flexed. A second spool-type valve 98 is provided with input orifices 100 and 102 which are connected respectively to the conduits 86 and 90 by respective conduits 104 and 106. The spool 108 of the valve 98 is mechanically linked to the rod 95. The spool 108 is positioned to the right when rod 95 moves to the right, and positioned to the left when the rod 95 moves to the left. An orifice 112 is an exhaust port.

In operation, the spool 77 is positioned to the left or right depending on the input command signal. When, for example, the spool 77 is moved to the right, the orifice 78 is covered and the orifice 80 is uncovered. This causes the pressure on the left side of the diaphragm 92 to rise and the pressure on the right side of the diaphragm to fall. The diaphragm 92 then flexes to the right, moving rods 60 and 95 to the right also. As the rod 95 is moved to the right, the spool 108 of valve 98 is moved to the right by the action of rod 95, thereby uncovering the orifice 100 and covering the orifice 102. When this happens, the pressure in the conduit 106 rises and the pressure in the conduit 104 falls. These pressures are applied to the diaphragm actuator 93 and tend to cancel the pressure which is flexing the diaphragm 92 to the right. However, because of the finite length of the conduit between orifice 100 and the left face of the diaphragm 92 and the finite length of the conduit between orifice 102 and the right face of the diaphragm, and also because of the finite volumes of those conduits and the diaphragm actuator 93, a period of time lapses before the pressures are built up and the cancelling action can take place. Hence, a time delayed feed-back to the input valve is effected.

When the spool 77 is moved to the left by a command signal, the opposite to the above described action occurs.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. Valve apparatus comprising input actuating means, first valve means coupled to and operated by said input actuating means, said valve means being adapted to pass a compressible fluid through it when it is opened and prevent said fluid from flowing through it when it is closed, actuating means having a movable member, said actuating means being responsive to the pressure of the fluid which flows through said first valve means to move said movable member, conduit means, and second valve means, operable with said movable member, adapted to pass a compressible fluid through it when it is opened and prevent said fluid from flowing through it when it is closed, said compressible fluid which flows through said second valve means being connected through said conduit means to said means having a movable member to apply the pressure of said compressible fluid to said means having a movable member to retard the movement of said movable member.

2. Valve apparatus comprising input actuating means, first and second valve means coupled to and operated by said input actuating means, said input actuating means being adapted to vary the relative amounts that said first and second valve means are opened, each of said valve means passing a compressible fluid the pressure of which depends on the amount the respective valve is opened, means respectively connected to said first and second valve means by first and second conduits, said means respectively connected to said first and second valve means having a movable member and being responsive to the pressures of the fluids which flow through said first and second valve means to move said member in one direction when the pressure of the fluid which flows through the first valve means is greater than pressure of the fluid which flows through the second valve means and to move said member in another direction when the pressure of the fluid which flows through the second valve means is greater than the pressure of the fluid which flows through the first valve means, conduit means, and third valve means coupled to said first and second conduits by respective conduit means, said third valve means being operable with said means having a movable member to connect a high pressure compressible fluid to the conduit having the lower fluid pressure, thereby retarding the movement of said movable member.

3. A two stage valve comprising a first stage and a second stage driven by said first stage, said first stage comprising input actuating means, first valve means coupled to and operated by said input actuating means, said valve means being adapted to pass a fluid through it when it is opened, and prevent said fluid from flowing through it when it is closed, actuating means having a movable member, said actuating means being responsive to the pressure of the fluid which flows through said first valve means to move said movable member, conduit means, and second valve means, operable with said movable member, adapted to pass a compressible fluid through it when it is opened and prevent said fluid from flowing through it when it is closed, said compressible fluid which flows through said second valve means being connected through said conduit means to said means having a movable member to apply the pressure of said compressible fluid to said means having a movable member to retard the movement of said movable member, and said second stage being provided with a valve which is operated by said movable member.

4. A two stage valve comprising a first stage and a second stage driven by said first stage, said first stage comprising input actuating means, first and second valve means coupled to and operated by said input actuating means, said input actuating means being adapted to vary the relative amounts that said first and second valve means are opened, each of said valve means passing a compressible fluid the pressure of which depends on the amount the respective valve is opened, means respectively connected to said first and second valve means by first and second conduits, said means respectively connected to said first and second valve means having a movable member and being responsive to the pressures of the fluids which flow through said first and second valve means to move said member in one direction when the pressure of the fluid which flows through the first valve means is greater than the pressure of the fluid which flows through the second valve means and to move said member in another direction when the pressure of the fluid which flows through the second valve means is greater than the pressure of the fluid which flows through the first valve means, conduit means, and third valve means coupled to said first and second conduits by respective conduit means, said third valve means being operable with said means having a movable member to connect a high pressure compressible fluid to the conduit having the lower fluid pressure, thereby retarding the movement of said movable member, and said second stage being provided with a valve which is operated by said movable member.

5. Valve apparatus comprising a first valve having first and second orifices, each orifice being adapted to pass a compressible fluid, said first valve being provided with means positionable relative to each of said orifices to vary the relative amounts of, and therefore the relative pressures of, the compressible fluids which flow through the orifices, means connected by conduit means to receive the fluid flowing through each orifice of said first valve, said means receiving the fluid flowing through each orifice being responsive to pressure differentials between the fluids flowing through the orifices and having connected to it a movable member, said member moving in one direction when the fluid flowing through one orifice has the higher pressure and moving in another direction when the fluid flowing through the other orifice has the higher pressure, a second valve having first and second orifices, each orifice being adapted to pass a compressible fluid, and means connected to said movable member, said means being positionable relative to said first and second orifices of said second valve to vary the relative amounts of, and therefore the relative pressures of, the compressible fluid which flows through the second valve orifices, the fluids flowing through the orifices of said second valve being connected by conduit means to said means responsive to pressure differentials, said means positionable relative to the first and second orifices of said second valve being moved by said movable member in a direction which applies the pressure differential between the compressible fluids flowing through the orifices of said second valve to said means responsive to pressure differentials to retard the movement of said movable member.

6. The structure of claim 5 wherein said first and second valves are flapper valves, each being provided with a pair of nozzles and a flapper positionable relative to each nozzle, the outlets of said first flapper valve nozzles are said first valve orifices, the outlets of said second flapper valve nozzles are said second valve orifices, and said means positionable relative to the first valve orifices and the means positionable relative to the second valve orifices are respectively the flappers of said first and second flapper valves.

7. The structure of claim 5 wherein said first and second valves are spool valves, each being provided with a pair of orifices and a spool positionable relative to each orifice, the orifices in said first and second valves are respectively the orifices of the first and second spool valves, and said means positionable relative to the first valve orifices and the means positionable relative to the second valve orifices are respectively the spools of said first and second spool valves.

8. A two stage valve comprising a first stage and a second stage driven by said first stage, said first stage comprising a first valve having first and second orifices, each orifice being adapted to pass a compressible fluid, said first valve being provided with means positionable relative to each of said orifices to vary the relative amounts of, and therefore the relative pressures of, the compressible fluids which flow through the orifices, means connected by conduit means to receive the fluid flowing through each orifice of said first valve, said means receiving the fluid flowing through each orifice being responsive to pressure differentials between the fluids flowing through the orifices and having connected to it an movable member, said member moving in one direction when the fluid flowing through one orifice has the higher pressure and moving in another direction when the fluid flowing through the other orifice has the higher pressure, a second valve having first and second orifices, each orifice being adapted to pass a compressible fluid and means connected to said movable members, said means being positionable relative to said first and second orifices of said second valve to vary the relative amounts of, and therefore the relative pressures of, the compressible fluid which flows through the second valve orifices, the fluid flowing through the orifices of said second valve being connected by conduit means to said means responsive to pressure differentials, said means positionable relative to the first and second orifices of said second valve being moved by said movable member in a direction which applies the pressure differential between the compressible fluids flowing through the orifices of said second valve to said means responsive to pressure differentials to retard the movement of said movable member, and said second stage being provided with a valve which is operated by said movable member.

9. A servo valve comprising a pressure responsive actuator, a valve adapted to pass a compressible fluid when open, means responsive to open and close said valve, whereby the pressure of the fluid adapted to pass through said valve increases and decreases when said valve is respectively closed and opened, conduit means connecting said actuator and said valve to apply the pressure of said compressible fluid to said actuator, a feedback valve also adapted to pass a compressible fluid when open, means connected to said actuator adapted to open and close said feedback valve, whereby the pressure of the compressible fluid adapted to pass through said feedback valve increases and decreases when said feedback valve is respectively closed and opened, and conduit means connecting said actuator and said feedback valve, thereby applying the pressure of the compressible fluid adapted to pass through said feedback valve to said actuator to retard the operation of said actuator.

No references cited.